United States Patent Office 2,819,286
Patented Jan. 7, 1958

2,819,286

3-UREIDOPHTHALIDES

Donald D. Wheeler and David C. Young, Midland, Mich., assignors to The Dow Chemical Company, Midland, Mich., a corporation of Delaware No Drawing. Application July 5, 1956
Serial No. 595,855

7 Claims. (Cl. 260—343.3)

This invention is concerned with phthalides having the formula

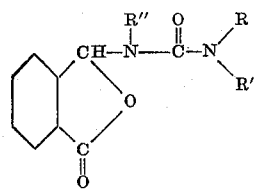

In this and succeeding formulae, R represents a lower alkyl, lower hydroxyalkyl, benzyl or phenyl radical; R' represents hydrogen or R, and R" represents hydrogen, methyl or ethyl; and wherein at least one of R' and R" is hydrogen. By the expression "lower alkyl" is meant radicals containing from 1 to 5 carbon atoms, inclusive, such as methyl, ethyl, isopropyl and amyl.

These new compounds are light colored solids somewhat soluble in many organic solvents such as ethanol and acetone and substantially insoluble in water and petroleum ether. They have utility as antimicrobials and particularly as agricultural fungicides. Certain of them are useful as insecticides.

The above compounds may be prepared by causing phthalaldehydic acid to react with a substituted urea having the structure

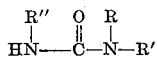

to produce the desired phthalide and water of reaction. The terms "phthalaldehydic acid" and "3-hydroxyphthalide" refer to a compound having the structure

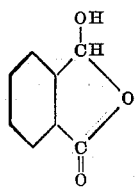

Phthalaldehydic acid is often represented in the literature as having the structure

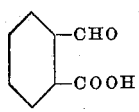

However, the acid employed in this invention and prepared as hereinafter described exists almost entirely in the 3-hydroxyphthalide ring structure, as indicated by its infrared absorption spectrum. Infrared data also indicate the phthalide products to have the ring structure.

In the synthesis, good results are obtained when substantially equimolar proportions of each reactant are employed, although the presence of a reasonable excess of either reactant does not interfere with the reaction. A large excess of phthalaldehydic acid, particularly under conditions of high temperature, may form an anhydride by-product. The reaction takes place smoothly in the temperature range of from 20° to 150° C. The reaction is generally carried out in the presence of a solvent as reaction medium. Suitable solvents include water, benzene and 2-butanone. Generally, the product precipitates in the reaction mixture and may be recovered by filtration. Where the phthalide product is soluble in the reaction medium, the solvent may be removed by vaporization and the product recovered as a residue.

In a preferred method of carrying out the reaction, phthalaldehydic acid is dissolved in a minimum amount of warm water and mixed with an aqueous solution containing an equimolar amount of the appropriate substituted urea. Usually the desired phthalide product begins to precipitate immediately. The resulting mixture or solution is warmed at 80° to 90° C. for from 10 to 90 minutes to complete the reaction and then cooled and filtered to recover the product. If desired, the latter may be recrystallized from a suitable solvent.

The following examples illustrate the invention, but are not to be construed as limiting.

*Example 1.—3-(3-ethylureido)phthalide*

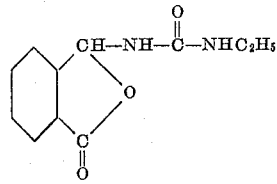

44 grams (0.5 mole) of ethylurea, 75 grams (0.5 mole) of phthalaldehydic acid and 250 milliliters of methyl ethyl ketone were mixed together and heated at 80° to 85° C. under reflux. After about 0.5 hour a solid 3-(3-ethylureido)phthalide product began to precipitate in the reaction mixture and increased in amount as the heating proceeded. At the end of 2.5 hours, the mixture was allowed to cool and the precipitate filtered therefrom. The latter was washed with water and dried to obtain 19.5 grams or a 99 percent yield of the desired purified phthalide product melting at 225°–227° C.

*Example 2.—3-(1,3-diethylureido)phthalide*

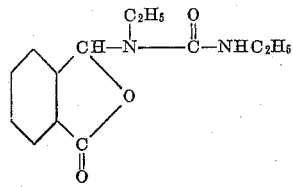

23.2 grams (0.2 mole) of 1,3-diethylurea, 30 grams (0.2 mole) of phthalaldehydic acid and 200 milliliters of water were mixed together and the solution heated on a steam bath for 1.5 hours. During the heating, a reaction took place with the formation of a 3-(1,3-diethylureido)phthalide product which precipitated from the mixture when it was cooled. The desired product was isolated from the mixture by filtration, washed first with benzene and then a benzene-acetone mixture and dried to recover a purified product which melted at 223.5°–224.5° C. with decomposition.

This product is useful as a fungicide, particularly against plant infesting fungi. In a representative operation, an aqueous formulation containing 625 parts of 3-(1,3-diethylureido)phthalide in a million parts of ultimate dispersion was applied to the leaves of a wheat plant and the latter thereafter inoculated with spores of the causative organism of wheat rust disease (*Puccinia graminis tritici*). When examined after inoculation, plants sprayed with the toxic formulation were found to be protected against wheat rust disease while untreated controls were covered with lesions characteristic of the disease.

*Example 3.—3-(3,3-diethylureido)phthalide*

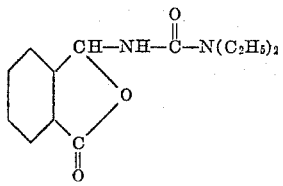

23.2 grams (0.2 mole) of N,N-diethylurea and 30.0 grams (0.2 mole) of phthalaldehydic acid were dissolved in 200 milliliters of water and heated on the steam bath. A reaction began to take place soon after the start of the heating process with a solid 3-(3,3-diethylureido)phthalide product precipitating in the mixture. When precipitation appeared to be complete, the mixture was cooled in an ice bath and the 3-(3,3-diethylureido)phthalide product was filtered from the mixture, washed with water and dried. The purified product melted at 123°–124° C. and was obtained in a yield of 45 grams or 81 percent of theoretical.

This product is useful as an insecticide. In a representative operation, substantially complete mortality was observed when cockroaches (*Periplaneta americana*) were wetted with an aqueous dispersion containing 0.24 gram of 3-(3,3-diethylureido)phthalide per 100 milliliters.

*Example 4.—3-(3-(2-hydroxyethyl)ureido)phthalide*

52 grams (0.5 mole) of 1-(2-hydroxyethyl)urea and 75 grams (0.5 mole) of phthalaldehydic acid were mixed with 200 milliliters of water and heated on the steam bath. On warming, a clear solution formed but soon solid product began to precipitate in the reaction mixture. The heating was continued for an hour, and the mixture thereafter cooled whereupon additional solid precipitated. The latter was removed from the mixture by filtration, and washed successively with water and acetone to obtain a 3-(3-(2-hydroxyethyl)ureido)phthalide product melting at 191°–192° C. The yield amounted to 61 grams or 52 percent of theoretical.

*Example 5.—3-(3-phenylureido)phthalide*

34.0 grams (0.25 mole) of phenylurea, 37.5 grams (0.25 mole) of phthalaldehydic acid and 150 milliliters of water were mixed together and heated on a steam bath for 3 hours. During the heating, a solid product precipitated. At the end of the heating period, the mixture was cooled and the solid product recovered by filtration. The latter was washed with warm water and dried to obtain a 3-(3-phenylureido)phthalide product which melted at 223°–224° C. with decomposition. The yield amounted to 59 grams or 88 percent of theoretical.

*Example 6.—3-(3-benzylureido)phthalide*

30.0 grams (0.2 mole) of benzylurea, 30 grams (0.2 mole) of phthalaldehydic acid and 150 milliliters of acetone were mixed together and heated under reflux for one-half hour on the steam bath. During the heating, a solid product gradually precipitated from the reaction mixture. The mixture was thereafter cooled and filtered to obtain a 3-(3-benzylureido)phthalide product which, after washing with cold acetone, melted at 193°–195° C. The yield amounted to 33.5 grams or 60 percent of theoretical.

*Example 7.—3-(3-methylureido)phthalide*

29.6 grams (0.4 mole) of methylurea was dissolved in 50 milliliters of warm water and added with stirring to a solution of 60.0 grams (0.4 mole) of phthalaldehydic acid in 200 milliliters of hot water. A solid product precipitated in the mixture after completion of the addition. The mixture was cooled and the solid separated therefrom by filtration. The latter was washed with water and dried to obtain a 3-(3-methylureido)phthalide product which melted at 229°–230° C. with decomposition. The yield amounted to 79.5 grams or 96.5 percent of theoretical.

The above product is useful as a germicide adapted to be employed for the control of bacterial organisms. For example, a solid nutrient agar medium saturated with 3-(3-methylureido)phthalide gave complete inhibition of growth when streaked with *Staphylococcus aureus* and incubated at 30° C. for three days.

In a similar manner, the following ureido phthalide products are prepared.

3-(3-butylureido)phthalide from the reaction of phthalaldehydic acid and butylurea.

3-(3-isopropylureido)phthalide from the reaction of phthalaldehydic acid and isopropylurea.

3-(1,3-dimethylureido)phthalide from the reaction of phthalaldehydic acid with 1,3-dimethylurea.

3-(3-(4-hydroxybutyl)ureido)phthalide from the reaction of phthalaldehydic acid and 1-(4-hydroxybutyl)urea.

The phthalaldehydic acid employed in this invention may be prepared by first photochlorinating o-xylene to obtain α,α,α',α'-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U. S. Patent 2,748,162.

We claim:

1. A phthalide having the formula

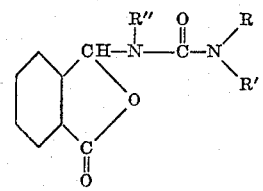

wherein R is a member of the group consisting of lower alkyl, lower hydroxyalkyl, benzyl, and phenyl; R' is a member of the group consisting of hydrogen, lower alkyl, lower hydroxyalkyl, benzyl and phenyl; and R" is a member of the group consisting of hydrogen, methyl and ethyl; and wherein at least one of R' and R" is hydrogen.

2. 3-(1,3-diethylureido)phthalide.
3. 3-(3-phenylureido)phthalide.
4. 3-(3-benzylureido)phthalide.
5. 3-(3,3-diethylureido)phthalide.
6. 3-(3-(2-hydroxyethyl)ureido)phthalide.
7. A method for preparing a phthalide having the formula

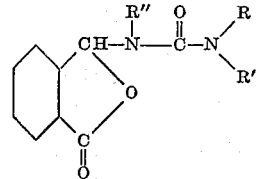

wherein R is a member of the group consisting of lower alkyl, lower hydroxyalkyl, benzyl and phenyl; R' is a member of the group consisting of hydrogen, lower alkyl, lower hydroxy alkyl, benzyl and phenyl; and R" is a member of the group consisting of hydrogen, methyl and ethyl; and wherein at least one of R' and R" is hydrogen, which comprises the step of mixing phthalaldehydic acid and a substituted urea having the structure

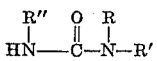

wherein R, R' and R" are as above defined and maintaining the mixture at a temperature range of from 20° to 150° C. for a time sufficient to allow completion of the reaction.

No references cited.